US012809677B2

(12) United States Patent
Punjj et al.

(10) Patent No.: US 12,809,677 B2
(45) Date of Patent: Nov. 24, 2026

(54) RESOURCE PRIORITIZATION USING MACHINE LEARNING TECHNIQUES

(71) Applicant: Dell Products L.P., Round Rock, TX (US)

(72) Inventors: Rohitt R Punjj, Bengaluru (IN); Renold Raj Devaraj, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 532 days.

(21) Appl. No.: 18/141,682

(22) Filed: May 1, 2023

(65) Prior Publication Data

US 2024/0370300 A1 Nov. 7, 2024

(51) Int. Cl.
*G06F 9/50* (2006.01)

(52) U.S. Cl.
CPC .................................. *G06F 9/5027* (2013.01)

(58) Field of Classification Search
None
See application file for complete search history.

(56) References Cited

U.S. PATENT DOCUMENTS

2018/0063327 A1* 3/2018 Eisner ................. H04M 3/5183
2018/0365621 A1* 12/2018 Merg ....................... G09B 7/02
2021/0014136 A1* 1/2021 Rath .................... G06Q 30/016

OTHER PUBLICATIONS

Gopal Behera & Neeta Nain, GSO-CRS: grid search optimization for collaborative recommendation system, Aug. 10, 2022, Springer, vol. 47, article No. 158, (2022). (Year: 2022).*
Zhenglin Xia, Hailong Sun, Jing Jiang, Xu Wang, Xudong Liu; A Hybrid Approach to Code Reviewer Recommendation with Collaborative Filtering, IEEE 2017 (Year: 2017).*
Benjamin Marlin, Richard S. Zemel; The Multiple Multiplicative Factor Model for Collaborative Filtering; Appearing in Proceedings of the 21 st International Conference on Machine Learning, Ban®, Canada, 2004. (Year: 2004).*
John Canny; Collaborative Filtering with Privacy via Factor Analysis; ACM 2002 (Year: 2002).*
Concept: Factor Analysis, http://mchp-appserv.cpe.umanitoba.ca/viewConcept.php?printer=Y&conceptID=1485, Oct. 19, 2016.
Su et al., A Survey of Collaborative Filtering Techniques, Advances in Artificial Intelligence, Oct. 27, 2009.
Korstanje, J., What is the difference between PCA and Factor Analysis? Towardsdatascience.com, https://towardsdatascience.com/what-is-the-difference-between-pca-and-factor-analysis-5362ef6fa6f9 , Dec. 7, 2020.

* cited by examiner

*Primary Examiner* — Abdullah Al Kawsar
(74) *Attorney, Agent, or Firm* — Ryan, Mason & Lewis, LLP

(57) ABSTRACT

Methods, apparatus, and processor-readable storage media for resource prioritization using machine learning techniques are provided herein. An example computer-implemented method includes obtaining data pertaining to multiple resources associated with at least one enterprise; prioritizing one or more of the multiple resources in connection with one or more tasks associated with the at least one enterprise by processing, using one or more machine learning techniques, at least a portion of the data pertaining to the multiple resources and data pertaining to the one or more tasks; and performing one or more automated actions based at least in part on the prioritizing of the one or more resources.

11 Claims, 5 Drawing Sheets

RESOURCE PRIORITIZATION USING MACHINE LEARNING TECHNIQUES

FIELD

The field relates generally to information processing systems, and more particularly to techniques for resource management in such systems.

BACKGROUND

Performance-related discrepancies across resources within enterprises can present challenges with respect to deploying such resources in connection with various enterprise tasks. However, conventional resource management techniques are commonly reactive and error-prone, often relying on time-varying user experience feedback and/or static rule-based approaches.

SUMMARY

Illustrative embodiments of the disclosure provide techniques for resource prioritization using machine learning techniques.

An exemplary computer-implemented method includes obtaining data pertaining to multiple resources associated with at least one enterprise, and prioritizing one or more of the multiple resources in connection with one or more tasks associated with the at least one enterprise by processing, using one or more machine learning techniques, at least a portion of the data pertaining to the multiple resources and data pertaining to the one or more tasks. Additionally, the method includes performing one or more automated actions based at least in part on the prioritizing of the one or more resources.

Illustrative embodiments can provide significant advantages relative to conventional resource management techniques. For example, problems associated with reactive and error-prone approaches are overcome in one or more embodiments through prioritizing resources associated with one or more enterprise-related tasks using machine learning techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
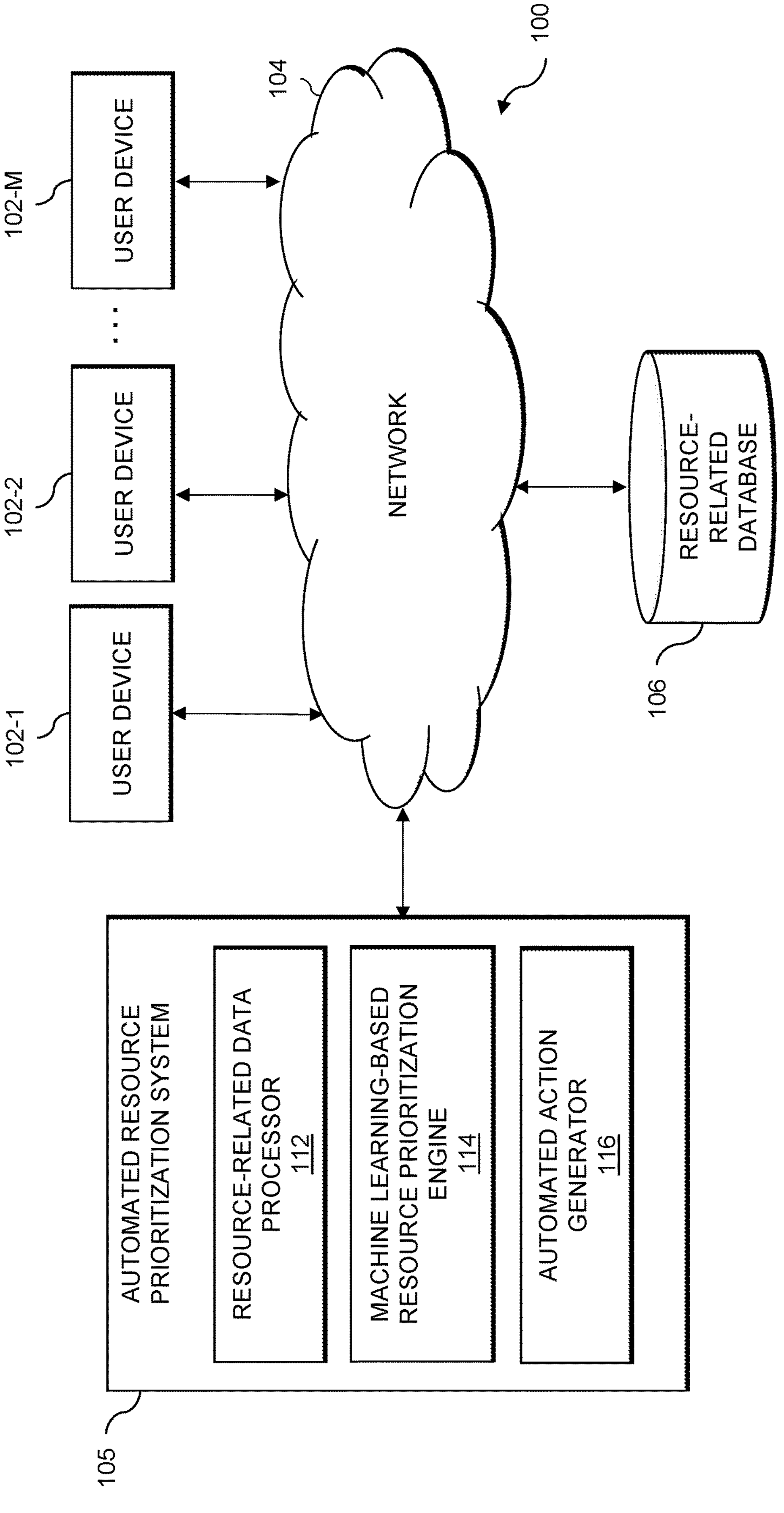
FIG. 1 shows an information processing system configured for resource prioritization using machine learning techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated resource prioritization system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (TP) or other related communication protocols.

Additionally, automated resource prioritization system 105 can have an associated resource-related database 106 configured to store data pertaining to historical resource task-related performance, historical resource training information, resource-related location information, resource-related availability information, resource-related capability information, etc.

The resource-related database 106 in the present embodiment is implemented using one or more storage systems associated with automated resource prioritization system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated resource prioritization system 105 are one or more input-output devices, which illustratively comprise keyboards, displays or other types of input-output devices in any combination. Such input-output devices can be used, for example, to support one or more user interfaces to automated resource prioritization system 105, as well as to support communication between automated resource prioritization system 105 and other related systems and devices not explicitly shown.

Additionally, automated resource prioritization system 105 in the FIG. 1 embodiment is assumed to be implemented using at least one processing device. Each such processing device generally comprises at least one processor and an associated memory, and implements one or more functional modules for controlling certain features of automated resource prioritization system 105.

More particularly, automated resource prioritization system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated resource prioritization system 105 to communicate over the network 104 with the user devices 102, and illustratively comprises one or more conventional transceivers.

The automated resource prioritization system 105 further comprises resource-related data processor 112, machine learning-based resource prioritization engine 114, and automated action generator 116.

It is to be appreciated that this particular arrangement of elements 112, 114 and 116 illustrated in the automated resource prioritization system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for resource prioritization using machine learning techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated resource prioritization system 105 and resource-related database 106 can be on and/or part of the same processing platform.

An exemplary process utilizing elements 112, 114 and 116 of an example automated resource prioritization system 105 in computer network 100 will be described in more detail with reference to the flow diagram of FIG. 3.

Accordingly, at least one embodiment includes resource prioritization using machine learning techniques. By way merely of example, such an embodiment can include automatically identifying appropriate and/or suitable (e.g., the best or most suitable) resources (e.g., field service engineers (FSEs) associated with a given enterprise) for one or more given tasks (e.g., one or more tasks across one or more product groupings and/or lines of business associated with a given enterprise) based at least in part on capabilities (e.g., FSE skills in terms of trainings, certifications, location, availability, dispatch handling behavior ascertained from dispatch duration(s), number of dispatches handled across one or more product groupings and/or lines of business, and/or performance metrics such as repeat dispatch rates, first time fixes, on-time service commitments, etc.) for preparing for and/or queuing one or more future workloads and/or dispatches, strategizing resource training needs, enhancing utilization of available resources, enhancing allocation of resources across tasks and/or portions of a given enterprise (e.g., staffing levels across different geographic locations), etc.

As further detailed herein, one or more embodiments include implementing one or more collaborative filtering techniques, which include at least one unsupervised machine learning-based recommendation generation method, to predict and/or prioritize resources within at least one given enterprise (e.g., FSEs across product groupings and/or lines of business) for workload planning in connection with enhanced resource-related capacity utilization. As used herein, collaborative filtering is a recommendation generation technique based at least in part on similarities among entities such as, for example, products and/or users. For example, collaborative filtering techniques can include unsupervised learning methods that process historical transactions to identify similarities across products and users, and generate one or more product recommendations for one or more users based thereon. Such recommendations can be obtained from at least one matrix of user-product information with ratings given by each user across each product. Similarly, skill ratings can be curated using skill-related and/or task-related attributes of users across each of multiple skills, represented in a matrix analogous to the at least one user-product matrix. The similarities across skill domains and different users can be determined from this matrix and skill ratings can be predicted for users for one or more future tasks.

Additionally or alternatively, one or more embodiments can also include determining resource training modifications (e.g., determining the best training duration and best training budgets across enterprise lines of business that would help with resource capacity planning) based at least in part on one or more resource prioritization determinations.

As noted above and further detailed herein, at least one embodiment includes implementing an unsupervised machine learning-based recommendation generation method, referred to herein as collaborative filtering, to predict and/or prioritize one or more resources in connection with one or more tasks and/or workloads. Such predicting and/or prioritizing can be carried out based at least in part on resource parameters such as, for example, one or more capability and/or skill domains associated with each resource, location(s) of each resource, availability of each resource, relevant training(s) of each resource, historical work performance of each resource (e.g., historical work performance related to one or more specific projects and/or one or more capabilities).

One or more embodiments can also include implementing at least one unsupervised learning technique to curate priority scores of resources (e.g., enterprise personnel) based at least in part on attributes such as detailed above and/or herein. In such an embodiment, factor analysis, a dimensionality reduction technique, can be implemented to curate at least one priority score referred to herein as a compounded score, which indicates at least one capability rating associated with at least one resource. As used herein, factor analysis refers to a statistical technique that can effectively bring out hidden common factors from data. In one or more embodiments, factor analysis can be used to quantify the commonality among user skills such as trainings and/or certifications completed, task-oriented attributes such as number of dispatches and/or tasks handled in the past, how well tasks were handled and how much time the users spent in handling the tasks, as well as personal attributes of users such as user location and user availability. Factor analysis determines correlation and/or commonality among such attributes and converts them into a compounded score that has the effect of all underlying factors considered.

Such an embodiment can also include enhancing and/or optimizing resource priority scores while determining preferred (e.g., the best) training duration information across various tasks (e.g., tasks associated with various lines of business and/or products) given one or more fixed training-related parameters (e.g., budget, timeline, etc.). Determining preferred training duration information for each product and/or skill, for example, can serve as a valuable input for creating a training plan for each product. For example, knowing and/or predicting future product demand, employees can be put through specific trainings as per the demand rather than putting the employees through comprehensive and/or non-specific time-consuming trainings.

Additionally or alternatively, one or more embodiments can include determining at least one training-related parameter (e.g., one or more training-related budgets) across various tasks (e.g., tasks associated with various lines of business and/or products) while maximizing and/or optimizing resource priority scores given historical performance data and historical training data associated with the given resources.

Also, as further detailed herein, at least one embodiment includes implementing one or more collaborative filtering techniques to filter information from one or more datasets (e.g., datasets related to transactional data) by analyzing and determining one or more similarities across at least a portion of such data. Such determined similarities can then be used, for example, to predict priority scores for enterprise resources (e.g., FSEs) across various tasks in connection with multiple resource prioritization attributes discussed above and herein.

Further, one or more embodiments include implementing one or more association rule mining techniques to determine and/or provide recommendations on the sequence of trainings that resources can go through based at least in part on historical data pertaining to tasks handled by the resources, trainings already completed and/or undertaken by the resources, and/or one or more future tasks expected and/or predicted to need resources (e.g., new products, etc.). As used herein, association rule mining refers to a data mining technique to uncover one or more associations and/or one or more relationships in large amounts of data. By way of example, based on mining historical trainings completed across products by users (e.g., engineers) as well as historical tasks done by them, one or more sequences of trainings across products can be determined using an Apriori algorithm.

Figure 2:
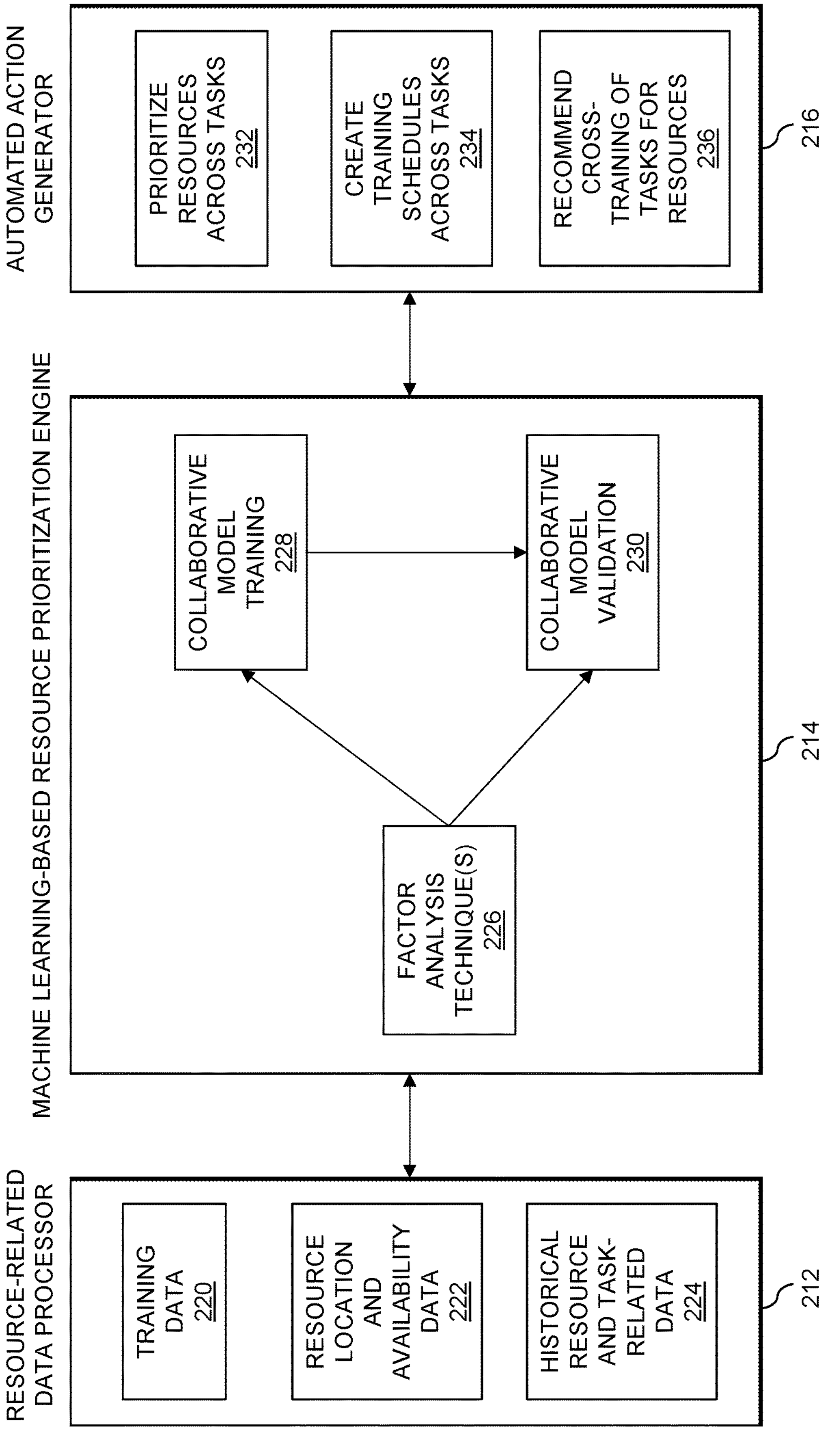
FIG. 2 shows an example predictive resource prioritization framework in an illustrative embodiment.

FIG. 2 shows an example predictive resource prioritization framework, in connection with a given set of resources, in an illustrative embodiment. By way of illustration, FIG. 2 depicts resource-related data processor 212, which processes training data 220 (e.g., data pertaining to trainings completed by one or more resources, certifications attained by one or more resources, etc.), resource location and availability data 222, and historical resource and task-related data 224 (e.g., data pertaining to tasks handled by one or more resources, etc.), and provides at least a portion of the processed data to machine learning-based resource prioritization engine 214. Using such provided data, machine learning-based resource prioritization engine 214 can train and/or implement at least one collaborative filtering model in conjunction therewith.

For example, machine learning-based resource prioritization engine 214 can process at least a portion of the data provided by resource-related data processor 212 and identifying one or more common factors from a group of attributes using at least one factor analysis technique 226. At least a portion of such factors can then be used to generate one or more priority scores and/or capability ratings for the given set of resources (e.g., engineers or other enterprise personnel). For instance, in one or more embodiments, resource priority scores can be generated and/or curated across various tasks based at least in part on learning and development attributes (e.g., completed trainings in a particular line of business, training duration across lines of business, completed certifications in a particular line of business, etc.), task-related attributes (e.g., dispatches handled in the past, average duration of dispatches, performance metrics across dispatches, etc.), and/or resource attributes (e.g., engineer attributes such as job level and/or grade, location, capacity, etc.) can be carried out using factor analysis technique(s) 226 which bring(s) out common latent factors from the aforementioned attributes across resources. Such factors can correspond to varying correlations with at least a portion of the aforementioned attributes, and the factors can be added together to generate a compound index referred to in one or more embodiments as a priority score for one or more resources.

As used herein, factor analysis refers to a model which allows for reducing information in a larger number of variables into a smaller number of variables, wherein such variables are referred to as latent variables. Factor analysis can be based on a model referred to as the common factor model, which starts from the principle that there a certain number of factors in a dataset, and that each of the measured variables captures a part of one or more of those factors.

In at least one embodiment, such priority scores are relative across resources for each of one or more task categories (e.g., one or more lines of business) and weightages can be associated with task-related attributes versus learning-related attributes to enhance and/or optimize the priority scores, such as illustrated as follows. For example, training duration optimization across lines of business (LOBs), in connection with a fixed training budget, can be computed as noted in the following equation:

$$Y_{LOB} = a * X + T$$

wherein $Y_{LOB}$ represents the priority score per LOB, X represents training duration of resources (e.g., engineers) across LOBs, T represents the training budget, which is kept constant, and a represents a weight and/or coefficient indicating a relationship between resource training times and priority score, per LOB.

Accordingly, in one or more embodiments, preferred and/or optimal training duration(s) across LOBs can be determined with a fixed training budget while maximizing the resources' priority scores using at least one genetic algorithm. As used herein a genetic algorithm refers to a heuristics-based solution for constrained and unconstrained optimization problems, wherein such a solution is based on the principle of natural selection. Such an embodiment can include assisting enterprises in ascertaining the best training times and/or duration(s) for each of one or more LOBs for both new hires and existing personnel, given a fixed training budget.

Additionally or alternatively, training budget optimization to maximize resource (e.g., engineers) priority scores across LOBs can be computed as noted in the following equation:

$$Y_{LOB} = A * (W + Z) + \lambda T$$

wherein $Y_{LOB}$ represents the priority score per LOB, W represents task-related factors across LOBs, Z represents training-related factors across LOBs, T represents the training budget per LOB, and A represents weightage determined for task and training attributes for resources, derived from historical tasks and/or trainings. As such, in one or more embodiments, the training budget per LOB can be optimized while maximizing the resource priority scores, maintaining the impact of past task experience and trainings constant across resources. Such an embodiment can include assisting enterprises in determining the best training budgets given the task handling experience and past trainings of resources across LOBs.

Referring again to FIG. 2, and based at least in part on output(s) of factor analysis technique(s) 226, at least one collaborative model can be trained in step 228. Additionally, based at least in part on output(s) of factor analysis technique(s) 226 and the model training in step 228, step 230 can include validating the at least one collaborative model. For example, in one or more embodiments, validating the at least one collaborative model can include selecting one or more predictions generated by the at least one collaborative model based on the lowest associated root-mean-square-error (RMSE) values representing the deviation between actual priority scores and model-predicted priority scores. Such values can be calculated, for example, as the square root of the mean of the squared differences between the actual and the model-predicted priority scores, wherein the smaller the RMSE value, the better the predictability of the at least one collaborative model.

In at least one embodiment, in connection with collaborative model training in step 228, the resource priority scores provided by factor analysis technique(s) 226 can be represented in a matrix format. This matrix can then be processed as input by the at least one collaborative filter model to learn one or more resource-related preferences based at least in part on a variety of attributes such as, for example, resource location, resource availability, resource capabilities, etc. The at least one collaborative filter model learns relationships between the resource priority scores and the attributes in the context of identifying similar resources and similar tasks. The at least one collaborative filter model then uses this learning to predict at least one resource priority score for a given task based at least in part on how similar the given resource is to other resources in the chosen data in terms of attributes (and any other additional inputs considered).

Additionally, priority scores for resources across tasks (e.g., engineers across LOBs) can be generated using the factor analysis technique(s) 226 and fed into the at least one collaborative filtering model in association with one or more predictor attributes to generate priority score predictions for each resource across each task (e.g., each product grouping-related task, each LOB-related task, etc.) for at least one future time period. In one or more embodiments, the predicted priority scores can be normalized (e.g., between 0 and 1) for each of one or more task categories (e.g., one or more LOBs) to identify and rank the best resources (e.g., engineers) based on corresponding priority scores.

Also, by way merely of example, one or more embodiments can include setting up data for a collaborative filter model in the format of a regression assuming, e.g., FSE-LOB ratings (e.g., priority scores) as dependent variables and factors such as FSE trainings, certifications, location, capacity, job grade, past work experience across LOBs, performance metrics, etc. as independent variables in the model set up. The relationship between the FSE-LOB ratings and such factors can be mathematically expressed as noted in the following equation:

$$FSE1 - \text{Product1}/LOB1\ \text{rating} + FSE2 - \text{Product2}/LOB2\ \text{rating} + FSE3 - \text{Product3}/LOB3\ \text{rating} + \ldots + FSE.n - \text{Product}.n/LOB.n\ \text{rating} = \text{FSE\_learnings} + \text{FSE\_location} + \text{FSE\_capacity} + \text{FSE\_work\_behavior} + \ldots$$

In at least one embodiment, multiple collaborative filtering techniques, such as, for example, user-based collaborative filters (UBCFs) and item-based collaborative filters (IBCFs), can be implemented to accurately predict the priority scores of resources across given tasks (e.g., FSEs across given LOBs and/or products). As used herein, UBCFs refer to a type of collaborative filter that identifies similarities among, for example, many users based on their purchase transactions in the past and suggests items that are highly rated by similar users. IBCFs refer to a type of collaborative filter that identifies similarities among, for example, items based on the items (e.g., products) users have already liked or positively interacted with.

In such an embodiment, the collaborative filtering technique that yields the lowest RMSE value(s) across multiple iterations can be selected as the best and/or final model for predicting priority scores for resources in connection with future tasks. For example, a grid search-based parameter optimization process can be run to identify the best collaborative filtering technique (e.g., from among the UBCFs and the IBCFs). With respect to a grid search-based parameter optimization process, a grid is created with parameters of a collaborative filtering algorithm, such as a similarity metric to use to calculate similarities among users and/or items, the number of nearest neighbors to consider for generating recommendations, and the collaborative filtering method to use (such as IBCF and/or UBCF, alternating least squares, etc.). Many collaborative filter models can be built and/or trained on the data as per the number of parameter combinations in the grid (e.g., each row in the grid will give rise to a unique model), and at least one algorithm can be configured to search for and select the best model (e.g., the best parameter combination from the grid) that has the least difference and/or deviation between n actual priority score and a predicted priority score (from the collaborative filter models) on a dataset for validation.

Referring again to FIG. 2, one or more outputs from the collaborative model validation in step 230 can be used by automated action generator 216 to initiate one or more automated actions. For example, action 232 can include prioritizing resources across tasks and/or task categories, action 234 can include creating one or more training schedules across tasks and/or task categories (e.g., based on determining training times and/or training durations), and action 236 can include recommending cross-training of tasks for given resources. By way merely of example, cross-training recommendations for engineers can be generated using association rule mining techniques by considering historical dispatch demand across LOBs across one or more time periods (e.g., fiscal quarters) with timestamps (e.g., start timestamps and end timestamps), and training history of the engineers across LOBs. Additionally, such example recommendations can be generated based at least in part on historical dispatches and/or historical dispatch demand across LOBs using an Apriori algorithm. Such cross-training recommendations can, for example, assist enterprises in clustering the trainings personnel (e.g., engineers) to handle work for new and/or relatively new products or tasks.

As detailed in connection with FIG. 2 and further described herein, one or more embodiments include implementing one or more collaborative filtering techniques. By way of illustration, at least one such embodiment can include a process flow for implementing at least one collaborative filtering model which includes input data preparation steps, data partitioning steps, and model training, validation, and prediction steps.

In such an embodiment, input data preparation can include, for example, curating priority scores for personnel (e.g., engineers) across different products and/or LOBs based at least in part on learning attributes (e.g., trainings, certifications, etc.), work attributes (e.g., dispatches handled, time spent on dispatches, performance metrics, etc.), and/or personal attributes (e.g., job level, location, availability, etc.) using factor analysis in connection with a given amount of historical data (e.g., the past two or more years of historical data).

Additionally, data partitioning can include preparing and/or implementing a training dataset, a validation dataset, and a prediction dataset. A training dataset can include, for example, personnel-LOB priority scores formatted in at least one matrix, along with one or more variables such as product-wise and/or LOB-wise trainings and certifications, LOB-wise performance metrics of personnel (e.g., average first time fixes, average repeat dispatches, average on-time commitments, etc.), and/or weekly capacity of personnel in units of hours, wherein such data is based on and/or derived from a given amount of historical data (e.g., the past two or more years until the penultimate latest quarter). Such a training dataset can then be used for training at least one collaborative filtering model.

An example validation dataset can include, for instance, personnel-LOB priority scores formatted in at least one matrix, along with one or more variables such as product-wise and/or LOB-wise trainings and certifications, LOB-wise performance metrics of personnel (e.g., such as average first time fixes, average repeat dispatches, average on-time commitments, etc.), and/or weekly capacity of engineers, in units of hours, for only the latest and/or most recent quarter. Such a validation dataset can then be used for validating the at least one collaborative filtering model.

Additionally, a prediction dataset can include, for example, LOB-wise performance metrics of personnel such as, e.g., average first time fixes, average repeat dispatches, average on-time commitments, etc., as well as weekly capacity of engineers in units of hours, and/or one or more other relevant variables extrapolated for a future time period (e.g., one or more future quarters) based at least in part on historical data.

In one or more embodiments, model training, validation, and prediction can include the use of dependent variables such as, for example, LOB-wise priority scores of personnel from the training dataset, as well as independent variables such as, for example, product-wise and/or LOB-wise trainings and certifications, LOB-wise performance metrics of personnel (e.g., average first time fixes, average repeat dispatches, average on-time commitments, etc.), and/or weekly capacity of personnel in units of hours.

Also, in connection with such model training, validation, and prediction, the model used can include at least one collaborative filtering model in a regression setup. The parameters used in connection with such a model can include, for example, the “k” parameter with respect to k-fold validation, the number of nearest neighbors chosen for similarity-based recommendations, the method(s) of collaborative filtering (e.g., UBCF, IBCF, hybrid, alternating least square (ALS), etc.), and/or similarity metric(s) (e.g., Euclidean measure, cosine similarity, Jaccard’s metric, etc.).

Additionally, in one or more embodiments, the training dataset (such as detailed above) is fed to and/or processed by the collaborative filtering model expressed as a regression model. A grid is then created with parameters of the collaborative filtering model such as, for example, the similarity metric to use to calculate similarities among personnel and/or items/products, the number of nearest neighbors to consider for generating recommendations, the collaborative filtering method to be used, etc. Multiple collaborative filter models can be built and/or trained on the dataset, as per the number of parameter combinations in the created grid (e.g., each row in the grid can give rise to a unique model), and an algorithm can be written to search and select the best model on the dataset for validation.

In at least one embodiment, model selection can include using root mean squared error values to determine differences between actual priority scores for personnel across each LOB in the validation dataset and predicted priority scores from multiple model parameter combinations, and whichever model parameter combination has the lowest RMSE can be identified and selected as the best model. Further, once selected, the given model can then be implemented to predict priority scores for one or more personnel across one or more LOBs based at least in part on the variables in the prediction dataset detailed above.

It is to be appreciated that some embodiments described herein utilize one or more artificial intelligence models. It is to be appreciated that the term "model," as used herein, is intended to be broadly construed and may comprise, for example, a set of executable instructions for generating computer-implemented recommendations and/or predictions. For example, one or more of the models described herein may be trained to generate recommendations and/or predictions based on resource-related data and/or task-related data collected from various data sources, and such recommendations and/or predictions can be used to initiate one or more automated actions (e.g., automatically allocating one or more resources to one or more particular tasks, automatically scheduling one or more training sessions for one or more resources, etc.).

Figure 3:
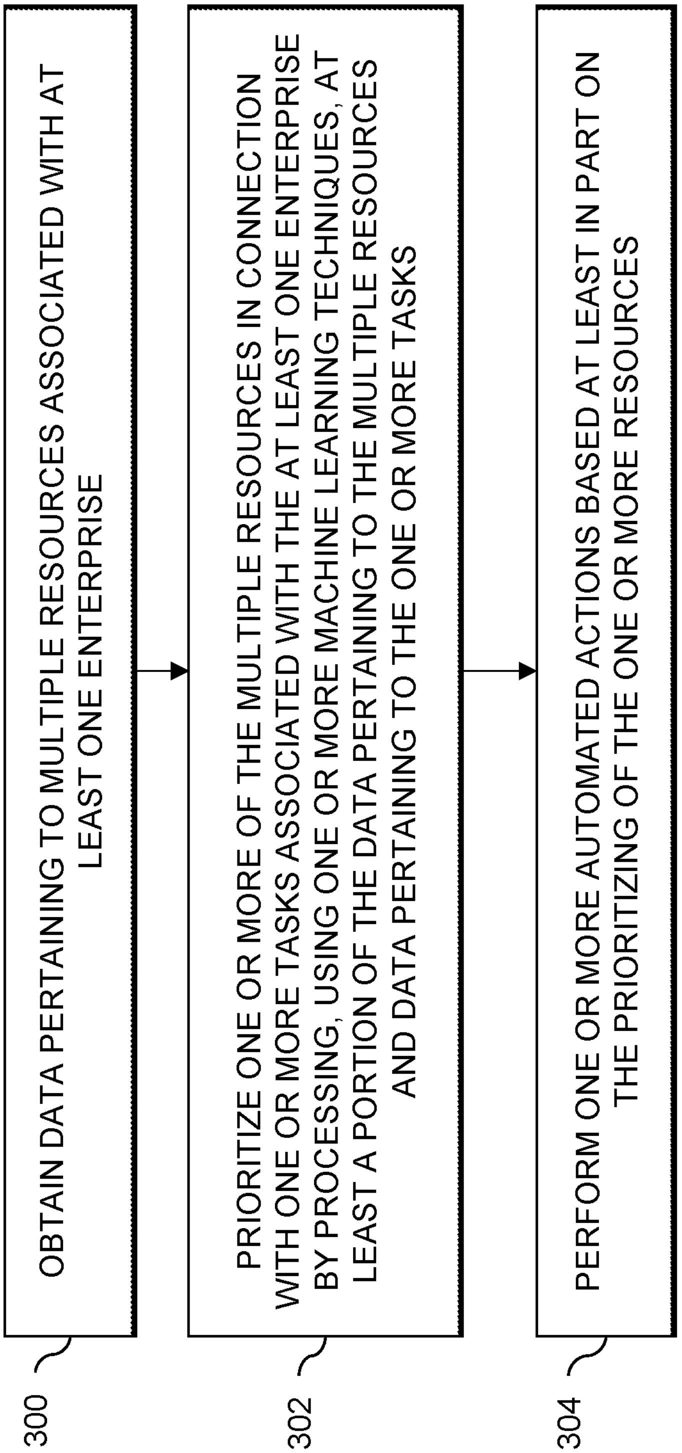
FIG. 3 is a flow diagram of a process for resource prioritization using machine learning techniques in an illustrative embodiment.

FIG. 3 is a flow diagram of a process for resource prioritization using machine learning techniques in an illustrative embodiment. It is to be understood that this particular process is only an example, and additional or alternative processes can be carried out in other embodiments.

In this embodiment, the process includes steps 300 through 304. These steps are assumed to be performed by automated resource prioritization system 105 utilizing elements 112, 114 and 116.

Step 300 includes obtaining data pertaining to multiple resources associated with at least one enterprise. In at least one embodiment, obtaining data pertaining to multiple resources includes obtaining one or more of resource capability-related data associated with at least a portion of the multiple resources, resource training-related data associated with at least a portion of the multiple resources, resource availability data associated with at least a portion of the multiple resources, resource location data associated with at least a portion of the multiple resources, and historical resource performance data associated with at least a portion of the multiple resources.

Step 302 includes prioritizing one or more of the multiple resources in connection with one or more tasks associated with the at least one enterprise by processing, using one or more machine learning techniques, at least a portion of the data pertaining to the multiple resources and data pertaining to the one or more tasks. In at least one embodiment, processing at least a portion of the data pertaining to the multiple resources and data pertaining to the one or more tasks includes processing the at least a portion of the data pertaining to the multiple resources and the data pertaining to the one or more tasks using one or more singular value decomposition (SVD) techniques, for example, in furtherance of dimension reduction and/or in conjunction with one or more collaborative filtering techniques.

In one or more embodiments, processing at least a portion of the data pertaining to the multiple resources and data pertaining to the one or more tasks includes processing the at least a portion of the data pertaining to the multiple resources and the data pertaining to the one or more tasks using one or more collaborative filtering techniques, wherein the one or more collaborative filtering techniques include at least one unsupervised machine learning-based recommendation generation technique. In such an embodiment, using one or more collaborative filtering techniques includes filtering information from one or more of the at least a portion of the data pertaining to the multiple resources and the data pertaining to the one or more tasks by determining one or more similarities across one or more of the at least a portion of the data pertaining to the multiple resources and the data pertaining to the one or more tasks. Also, prioritizing one or more of the multiple resources in connection with the one or more tasks associated with the at least one enterprise can include generating one or more priority scores, across each of the one or more tasks, for at least a portion of the multiple resources based at least in part on the one or more determined similarities. Further, generating one or more priority scores, across each of the one or more tasks, for at least a portion of the multiple resources can include implementing one or more weights associated with one or more task-related attributes. Additionally or alternatively, using one or more collaborative filtering techniques can include using multiple collaborative filtering techniques comprising one or more user-based collaborative filters and item-based collaborative filters, in conjunction with at least one grid search-based parameter optimization process.

Also, in at least one embodiment, prioritizing one or more of the multiple resources can include processing, using the one or more machine learning techniques in conjunction with one or more factor analysis techniques, the at least a portion of the data pertaining to the multiple resources and the data pertaining to the one or more tasks.

Step 304 includes performing one or more automated actions based at least in part on the prioritizing of the one or more resources. In at least one embodiment, performing one or more automated actions includes automatically allocating at least a portion of the one or more prioritized resources to one or more systems associated with at least a portion of the one or more tasks. Additionally or alternatively, performing one or more automated actions can include automatically training at least a portion of the one or more machine learning techniques based at least in part on feedback pertaining to the prioritizing of the one or more resources.

Also, in one or more embodiments, performing one or more automated actions includes initiating one or more resource training schedules for at least a portion of the multiple resources based at least in part on the prioritizing of the one or more resources. In such an embodiment, initiating one or more resource training schedules can include implementing one or more association rule mining techniques in connection with historical data pertaining to one or more tasks handled by the at least a portion of the multiple resources, training already completed by the at least a portion of the multiple resources, and one or more future tasks expected to need at least a portion of the multiple resources.

Accordingly, the particular processing operations and other functionality described in conjunction with the flow diagram of FIG. 3 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically prioritize resources using machine learning techniques. These and other embodiments can effectively overcome problems associated with reactive and error-prone approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of system 100, these platforms may also be used to implement at least portions of other information processing systems in other embodiments.

Figure 4:
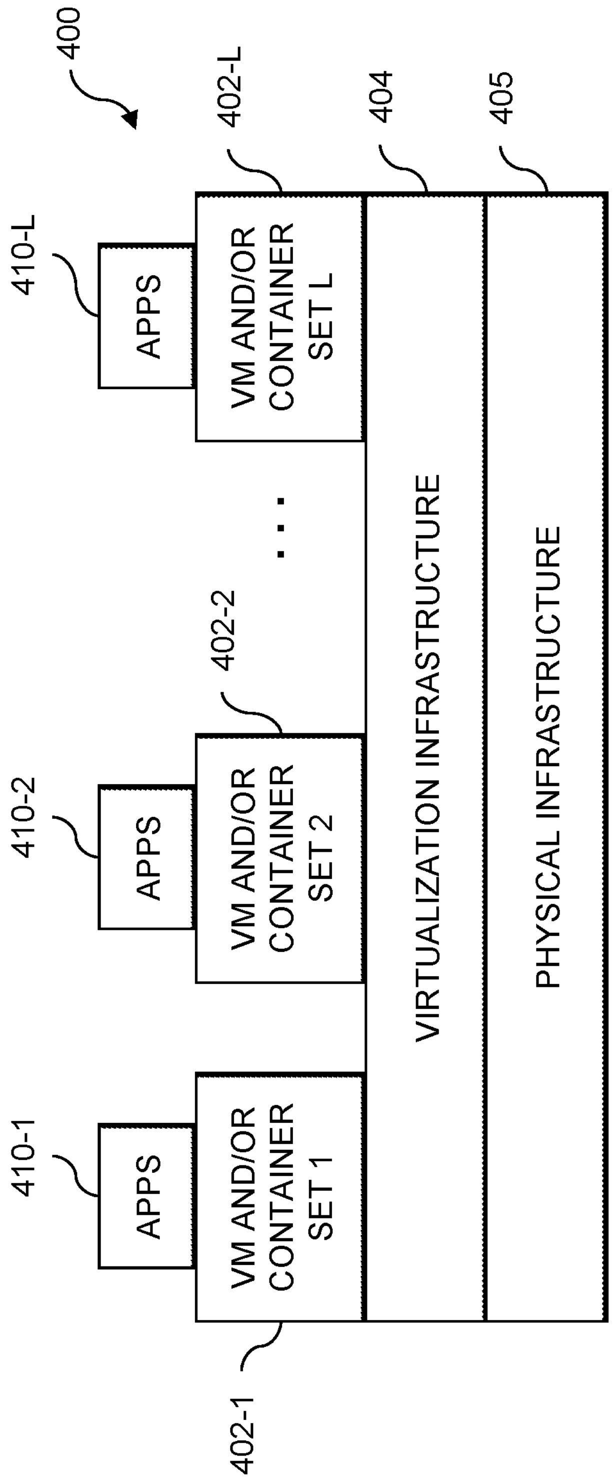
FIGS. 4 and 5 show examples of processing platforms that may be utilized to implement at least a portion of an information processing system in illustrative embodiments.
Figure 5:
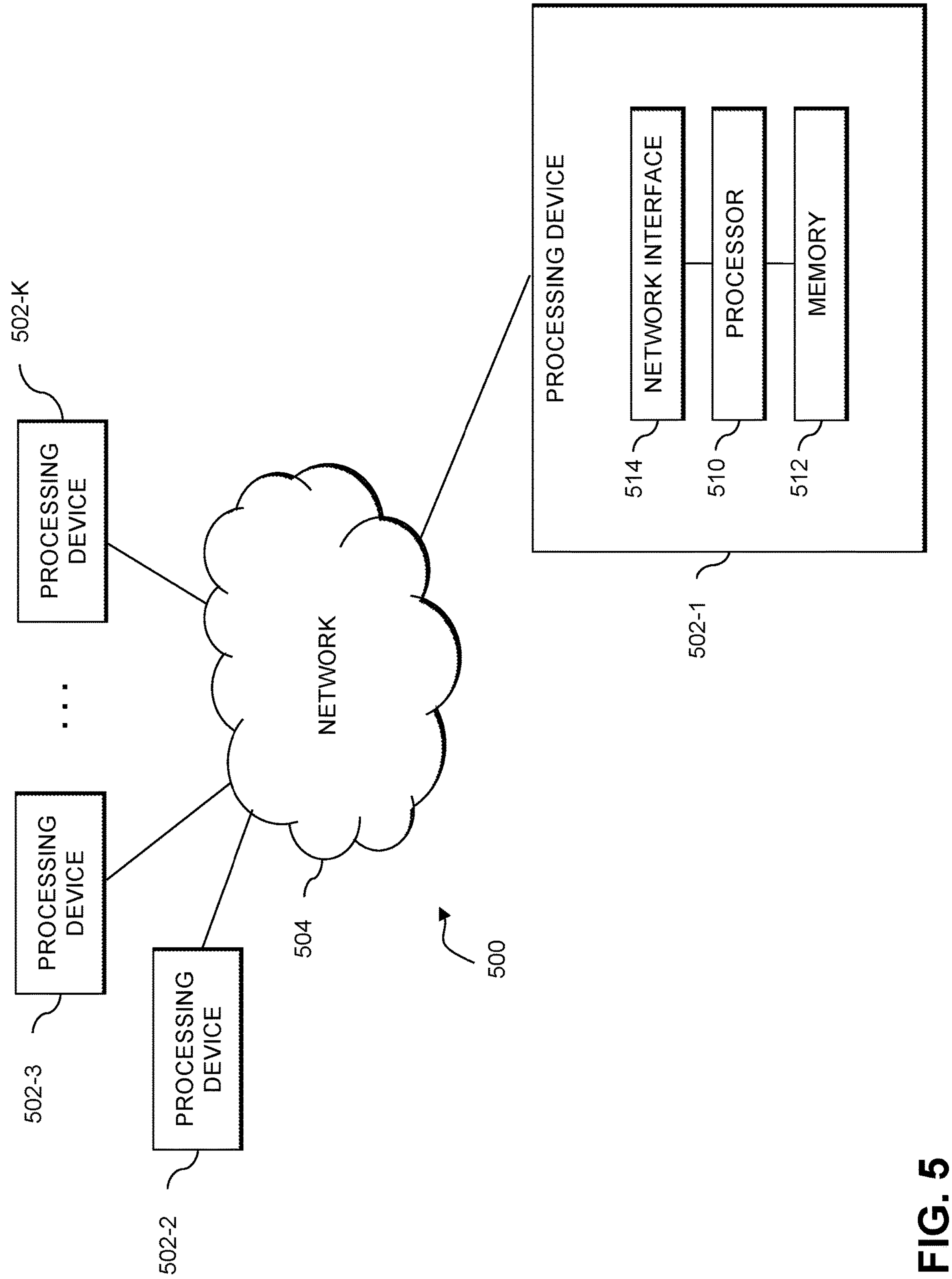

FIG. 4 shows an example processing platform comprising cloud infrastructure 400. The cloud infrastructure 400 comprises a combination of physical and virtual processing resources that are utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 comprise respective VMs, respective sets of one or more containers, or respective sets of one or more containers running in VMs. In some implementations of the FIG. 4 embodiment, the VMs/container sets 402 comprise respective VMs implemented using virtualization infrastructure 404 that comprises at least one hypervisor.

A hypervisor platform may be used to implement a hypervisor within the virtualization infrastructure 404, wherein the hypervisor platform has an associated virtual infrastructure management system. The underlying physical machines comprise one or more information processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 502-1 in the processing platform 500 comprises a processor 510 coupled to a memory 512.

The processor 510 comprises a microprocessor, a CPU, a GPU, a TPU, a microcontroller, an ASIC, a FPGA or other type of processing circuitry, as well as portions or combinations of such circuitry elements.

The memory 512 comprises random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

obtaining, by an automated resource prioritization system, data pertaining to multiple resources associated with at least one enterprise, wherein obtaining data pertaining to multiple resources comprises obtaining resource capability-specific training data associated with at least a portion of the multiple resources, and historical resource performance data comprising at least dispatch-related data associated with at least a portion of the multiple resources from a resource-related database remote from the automated resource prioritization system;

prioritizing, by the automated resource prioritization system, one or more of the multiple resources in connection with one or more tasks associated with the at least one enterprise by processing, using machine learning techniques, at least a portion of the data pertaining to the multiple resources and data pertaining to the one or more tasks, wherein using the machine learning techniques comprise:

(i) implementing at least one factor analysis technique that processes a plurality of resource attributes across the multiple resources (a) to generate, for at least a portion of the multiple resources, a plurality of priority scores, in a matrix format, derived from latent common factors extracted from the plurality of resource attributes, and (b) to adjust the plurality of priority scores based at least in part on weights associated with task-related attributes and learning-related attributes, and (ii) selecting at least one collaborative filtering model, which processes the plurality of priority scores output by the at least one factor analysis technique to identify the one or more of the multiple resources for prioritization; and performing automated actions based at least in part on the prioritizing of the one or more resources, wherein performing automated actions comprises:

automatically allocating at least a portion of the one or more prioritized resources to one or more systems associated with executing at least a portion of the one or more tasks;

automatically creating one or more resource training schedules for at least a portion of the multiple resources based at least in part on the prioritizing of the one or more resources by implementing one or more association rule mining techniques in connection with data pertaining to (i) one or more tasks handled by the at least a portion of the multiple resources, (ii) training already completed by the at least a portion of the multiple resources, and (iii) one or more future tasks expected to need the at least a portion of the multiple resources; and automatically training at least a portion of the machine learning techniques using feedback pertaining to the prioritizing of the one or more resources;

wherein the at least one collaborative filtering model is selected from training a plurality of collaborative filtering models comprising:

performing a grid search-based parameter enhancement process comprising creating a grid of plurality of parameters;

building the plurality of collaborative filtering models by implementing at least a portion of the plurality of parameters from the grid;

training the plurality of collaborative filtering models based at least in part on one or more portions of the obtained data from the resource-related database;

configuring an algorithm to perform at least one search on the grid and selecting the at least one collaborative filtering model in connection based at least in part on the search and at least one validation dataset;

wherein the method is performed by at least one processing device comprising a processor coupled to a memory.

2. The computer-implemented method of claim 1, wherein the at least one collaborative filtering model comprises at least one unsupervised machine learning-based recommendation generation technique.

3. The computer-implemented method of claim 2, further comprising:

using the at least one collaborative filtering model comprising filtering information from one or more of the at least a portion of the data pertaining to the multiple resources and the data pertaining to the one or more tasks by determining one or more similarities across one or more of the at least a portion of the data pertaining to the multiple resources and the data pertaining to the one or more tasks.

4. The computer-implemented method of claim 3, wherein using the at least one collaborative filtering model comprises using one or more user-based collaborative filters and one or more item-based collaborative filters, in conjunction with the grid search-based parameter enhancement process.

5. The computer-implemented method of claim 1, wherein obtaining data pertaining to multiple resources further comprises obtaining one or more of resource capability-related data associated with at least a portion of the multiple resources, resource availability data associated with at least a portion of the multiple resources, and resource location data associated with at least a portion of the multiple resources.

6. A non-transitory processor-readable storage medium having stored therein program code of one or more software programs, wherein the program code when executed by at least one processing device causes the at least one processing device:

to obtain, by an automated resource prioritization system, data pertaining to multiple resources associated with at least one enterprise, wherein obtaining data pertaining to multiple resources comprises obtaining resource capability-specific training data associated with at least a portion of the multiple resources, and historical resource performance data comprising at least dispatch-related data associated with at least a portion of the multiple resources from a resource-related database remote from the automated resource prioritization system;

to prioritize, by the automated resource prioritization system, one or more of the multiple resources in connection with one or more tasks associated with the at least one enterprise by processing, using machine learning techniques, at least a portion of the data pertaining to the multiple resources and data pertaining to the one or more tasks, wherein using the machine learning techniques comprise:

(i) implementing at least one factor analysis technique that processes a plurality of resource attributes across the multiple resources (a) to generate, for at least a portion of the multiple resources, a plurality of priority scores, in a matrix format, derived from latent common factors extracted from the plurality of resource attributes, and (b) to adjust the plurality of priority scores based at least in part on weights associated with task-related attributes and learning-related attributes, and (ii) selecting at least one collaborative filtering model, which processes the plurality of priority scores output by the at least one factor analysis technique to identify the one or more of the multiple resources for prioritization; and to perform automated actions based at least in part on the prioritizing of the one or more resources, wherein performing automated actions comprises:

automatically allocating at least a portion of the one or more prioritized resources to one or more systems associated with executing at least a portion of the one or more tasks;

automatically creating one or more resource training schedules for at least a portion of the multiple resources based at least in part on the prioritizing of the one or more resources by implementing one or more association rule mining techniques in connection with data pertaining to (i) one or more tasks handled by the at least a portion of the multiple resources, (ii) training already completed by the at least a portion of the multiple resources, and (iii) one or more future tasks expected to need the at least a portion of the multiple resources; and automatically training at least a portion of the machine learning techniques using feedback pertaining to the prioritizing of the one or more resources;

wherein the at least one collaborative filtering model is selected from training a plurality of collaborative filtering models comprising:

performing a grid search-based parameter enhancement process comprising creating a grid of plurality of parameters;

building the plurality of collaborative filtering models by implementing at least a portion of the plurality of parameters from the grid;

training the plurality of collaborative filtering models based at least in part on one or more portions of the obtained data from the resource-related database;

configuring an algorithm to perform at least one search on the grid and selecting the at least one collaborative filtering model in connection based at least in part on the search and at least one validation dataset.

7. The non-transitory processor-readable storage medium of claim 6, wherein the at least one collaborative filtering model comprises at least one unsupervised machine learning-based recommendation generation technique.

8. An apparatus comprising:

at least one processing device comprising a processor coupled to a memory;

the at least one processing device being configured:

to obtain, by an automated resource prioritization system, data pertaining to multiple resources associated with at least one enterprise, wherein obtaining data pertaining to multiple resources comprises obtaining resource capability-specific training data associated with at least a portion of the multiple resources, and historical resource performance data comprising at least dispatch-related data associated with at least a portion of the multiple resources from a resource-related database remote from the automated resource prioritization system;

to prioritize, by the automated resource prioritization system, one or more of the multiple resources in connection with one or more tasks associated with the at least one enterprise by processing, using machine learning techniques, at least a portion of the data pertaining to the multiple resources and data pertaining to the one or more tasks, wherein using the machine learning techniques comprise:

(i) implementing at least one factor analysis technique that processes a plurality of resource attributes across the multiple resources (a) to generate, for at least a portion of the multiple resources, a plurality of priority scores, in a matrix format, derived from latent common factors extracted from the plurality of resource attributes, and (b) to adjust the plurality of priority scores based at least in part on weights associated with task-related attributes and learning-related attributes, and (ii) selecting at least one collaborative filtering model, which processes the plurality of priority scores output by the at least one factor analysis technique to identify the one or more of the multiple resources for prioritization; and to perform automated actions based at least in part on the prioritizing of the one or more resources, wherein performing automated actions comprises:

automatically allocating at least a portion of the one or more prioritized resources to one or more systems associated with executing at least a portion of the one or more tasks;

automatically creating one or more resource training schedules for at least a portion of the multiple resources based at least in part on the prioritizing of the one or more resources by implementing one or more association rule mining techniques in connection with data pertaining to (i) one or more tasks handled by the at least a portion of the multiple resources, (ii) training already completed by the at least a portion of the multiple resources, and (iii) one or more future tasks expected to need the at least a portion of the multiple resources; and automatically training at least a portion of the machine learning techniques using feedback pertaining to the prioritizing of the one or more resources;

wherein the at least one collaborative filtering model is selected from training a plurality of collaborative filtering models comprising:

performing a grid search-based parameter enhancement process comprising creating a grid of plurality of parameters;

building the plurality of collaborative filtering models by implementing at least a portion of the plurality of parameters from the grid;

training the plurality of collaborative filtering models based at least in part on one or more portions of the obtained data from the resource-related database;

configuring an algorithm to perform at least one search on the grid and selecting the at least one collaborative filtering model in connection based at least in part on the search and at least one validation dataset.

9. The apparatus of claim 8, wherein the at least one collaborative filtering model comprises at least one unsupervised machine learning-based recommendation generation technique.

10. The apparatus of claim 9, further comprising: using the at least one collaborative filtering model comprising filtering information from one or more of the at least a portion of the data pertaining to the multiple resources and the data pertaining to the one or more tasks by determining one or more similarities across one or more of the at least a portion of the data pertaining to the multiple resources and the data pertaining to the one or more tasks.

11. The apparatus of claim 10, wherein using the at least one collaborative filtering model comprises using one or more user-based collaborative filters and one or more item-based collaborative filters, in conjunction with the grid search-based parameter enhancement process.

* * * * *